XR 3,653,067

5044W

United Stat

Anderson et al.

[15] 3,653,067

[45] Mar. 28, 1972

[54] HIGH-SPEED PRINTING APPARATUS

[72] Inventors: Lawrence Keith Anderson, Stirling; Martin Feldman, Springfield, both of N.J.

[73] Assignee: Bell Telephone Laboratories, Incorporated, Murray Hill, N.J.

[22] Filed: Dec. 16, 1970

[21] Appl. No.: 98,741

[52] U.S. Cl...................................346/108, 95/4.5, 178/30, 340/324 R, 340/366, 350/3.5, 350/161

[51] Int. Cl...........................................................B41b 21/24

[58] Field of Search...............346/108, 107; 95/4.5; 350/3.5, 350/160 R, 161; 178/30, 15; 340/324 R, 336, 173 MA

[56] References Cited

UNITED STATES PATENTS

| | | | |
|---|---|---|---|
| 3,055,258 | 9/1962 | Hurvitz | 350/161 X |
| 3,308,452 | 3/1967 | Michel et al. | 340/324 |

OTHER PUBLICATIONS

Roshon, D. D.; Scanlaser Printing Process; IBM Technical Disclosure Bulletin, Vol. 11, No. 10, March 1969, p. 1329.

Eichelberger et al., Optical Printer; IBM Technical Disclosure Bulletin, Vol. 12, No. 1, June 1969, pp. 40–41.

*Primary Examiner*—Joseph W. Hartary

*Attorney*—R. J. Guenther and Kenneth B. Hamlin

[57] ABSTRACT

A high-speed printer includes a prerecorded compressed font stored, for example, in holographic form. The constituent parts (for example, bars) of a set of characters to be printed are stored in the hologram. By means of acousto-optic deflection techniques, an incident light beam is directed to illuminate simultaneously the plural areas of the hologram which store the constituent parts of a character selected to be printed. In turn, representations of the parts stored in the illuminated areas are imaged onto a suitable recording medium where recombination and printing of the selected character take place.

8 Claims, 3 Drawing Figures

INVENTORS L. K. ANDERSON
M. FELDMAN
BY
Lucian C. Canepa
ATTORNEY

HIGH-SPEED PRINTING APPARATUS

This invention relates to an arrangement for selectively deflecting light beams and more particularly to such an arrangement, including cascaded acousto-optic deflectors, used as a high-speed printing apparatus.

BACKGROUND OF THE INVENTION

One known technique employed in the field of high-speed printing involves selecting characters to be printed from a prerecorded font. The selection process may, for example, include deflecting an optical beam to the known location of a prerecorded character and projecting an image of the selected character onto a suitable recording medium.

It is known that holograms are particularly well suited for storing the prerecorded font required in such a printing system. By deflecting a coherent light beam to a specified location on a hologram, a particular stored representation is selected for readout.

One advantageous way of formatting the characters stored in a hologram which is to be used in a printing system is to include only one character, repeated many times, in each row of the holographic medium. In such a format, each row would contain as many representations as there are character positions per row on the recording medium. Thus, the letter A, for example, can be imaged onto any specified position in a row on a stationary recording medium simply by deflecting an incident light beam to the correspondingly-positioned area of a row of A's stored in the hologram. Once an entire row has been printed, the recording medium is mechanically translated, by an amount equal to the distance between adjacent rows, thereby to prepare the system for the printing of another row of characters.

The technique of font compression as applied to printing and display apparatus is also known. In accordance with this technique, a large repertory of prerecorded distinct characters is replaced by a much more restricted set of constituent elements. In accordance with this approach, a required character can be constructed by a selective superposition of prerecorded dots or bars. A familiar example of this general type of compression is the conventional 7-bar format used in some digital test instruments to generate the numerals 0 through 9.

SUMMARY OF THE INVENTION

An object of the present invention is an improved printing apparatus.

More specifically, an object of this invention is a printing apparatus of the light beam deflection type which is characterized by high-speed, reliability, simplicity and a minimal number of mechanically-moving parts.

Another object of the present invention is a high-speed printing apparatus in which acousto-optic light deflectors are utilized to access a prerecorded compressed font and to achieve readout therefrom of the constituent elements of a character to be printed.

Briefly, these and other objects of the present invention are realized in a specific illustrative embodiment thereof that comprises a storage medium such as, for example, a hologram. The constituent elements from which a complete character font can be reconstituted are stored in rows and columns in the hologram. In particular, each row of the hologram contains repeated representations of a different one of the constituent elements.

Two conventional orthogonally-disposed acousto-optic deflectors are positioned between the storage medium and a modulated coherent light beam source. One of the deflectors is utilized to sweep the light beam from left to right across the storage medium. The other or vertical deflector is simultaneously driven by plural preselected frequencies which are programmed to be representative of the constituent stored elements of a particular character to be recorded. The output of the vertical deflector comprises plural light beams simultaneously directed at different areas included in one specified column of the holographic array. Each beam position on the storage medium is determined by one of the applied frequencies. As a result, the constituent elements stored at the plural illuminated areas of the hologram are imaged onto a suitable recording medium. In this way reconstruction and printing of the selected character take place. This is accomplished in an advantageous high-speed manner utilizing only a relatively small set of prerecorded constituent elements.

A feature of the present invention is that an acousto-optic deflector is controlled by plural simultaneously-applied signals to direct portions of an incident light beam simultaneously to the plural discrete areas of a storage medium where the representative constituent elements of a selected character to be printed are stored.

Another feature of this invention is that the constituent representations stored in the illuminated areas of the storage medium are simultaneously imaged onto a recording surface for reconstitution and recording of the selected character.

BRIEF DESCRIPTION OF THE DRAWING

A complete understanding of the present invention and of the above and other objects, features and advantages thereof may be gained from a consideration of the following detailed description of an illustrative embodiment thereof presented hereinbelow in connection with the accompanying drawing, in which.

DETAILED DESCRIPTION

The basic phenomenon underlying the mode of operation of the acousto-optic deflectors to be described hereinbelow is that of Bragg diffraction, which is described, for example, by E. I. Gordon in the Proceedings of the IEEE, Oct. 1966, pp. 1391–1401.

Figure 1A:
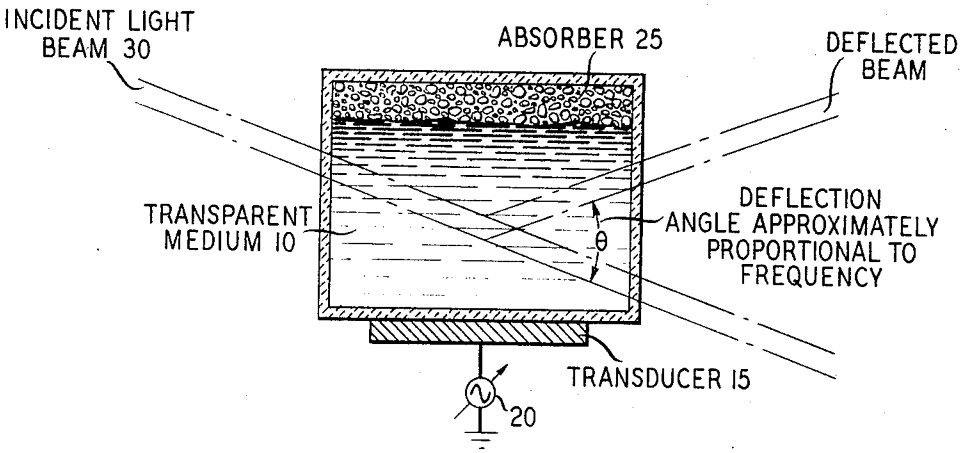
FIG. 1A (PRIOR ART)
FIG. 1A shows a prior art acousto-optic deflector whose mode of operation is based on Bragg diffraction.

Bragg diffraction can be explained with the aid of the prior art arrangement schematically shown in FIG. 1A. Ultrasonic waves are launched into a transparent medium 10 (such as, for example, water or alpha iodic acid or lead molybdate) by electrically activating a transducer 15 (made, for example, of lithium niobate) by means of a variable-frequency generator 20. (Waves so launched in the medium 10 may be absorbed at the far end thereof by any suitable absorber 25.) Accompanying the launched wave is a periodic modulation of the index of refraction of the medium 10, which results from the alternate compression and rarefaction of the medium by the ultrasonic wave. The net result, in effect, is the production in he medium of a three-dimensional diffraction grating.

An incident light beam 30 is directed through the medium 10 as shown in FIG. 1A. A portion of the beam incident on the ultrasonic grating at or near a certain special angle called the Bragg angle is scattered through an angle that depends on the grating spacing (that is, on the ultrasonic wavelength). In fact, for the small scattering angles (of the order of 1°) normally encountered in practice, this deflection angle is nearly proportional to frequency. Thus, by changing the ultrasonic frequency in steps, one can obtain a sequence of discrete beam deflections.

In an acousto-optic deflector of the type illustrated in FIG. 1A, the range of achievable deflection angles is proportional to the bandwidth over which acoustical energy can be injected into the medium 10. Moreover, in order to get efficient deflection, it is necessary that the incoming light beam and the diffracted (deflected) beam fulfill, or approximately fulfill, the Bragg condition with respect to the acoustical wave front. (A maximum output of light from the deflector shown in FIG. 1A is obtained when the plane tangential to the ultrasonic wave front bisects the deflection angle $\theta$.) If the direction of the acoustical wave front is fixed with respect to the incident light beam, it is apparent that there is only a limited range of angles for which the Bragg condition is satisfied or approximately satisfied.

By means of the arrangement shown in FIG. 1A (which constitutes what will be referred to hereinafter as a vertical deflector) it is possible to direct an incident light beam to any one of a plurality of target areas disposed along a vertical straight line. Furthermore, it is known to cascade two such deflectors (one rotated 90° with respect to the other) to form a conventional x–y deflection arrangement. Such an arrangement is depicted in simplified schematic form in FIG. 1B. In the interest of not obscuring the basic arrangement intended to be portrayed by FIG. 1B, no focusing lenses, aperture-limiting devices or other conventional optical elements, whose nature and utilization are well known in the art, have been shown therein. Similarly, undeflected light, which passes through the deflectors without interacting therewith, has been omitted from the drawing.

Figure 1B:
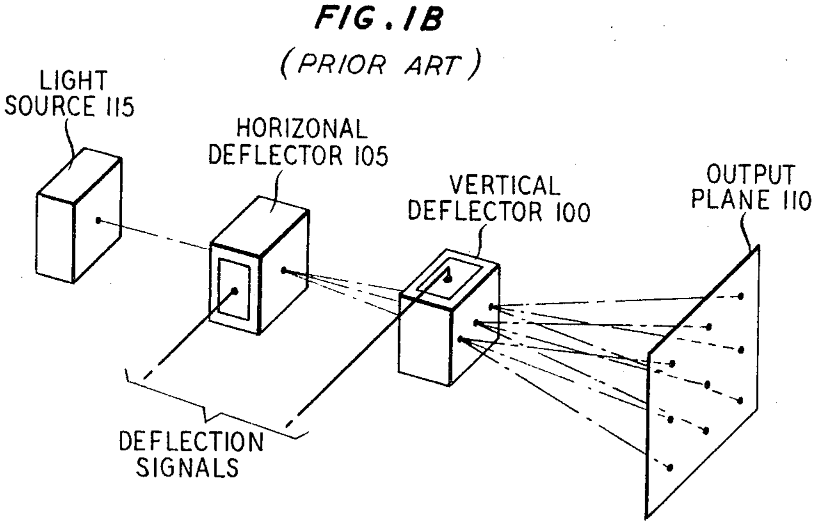
FIG. 1B (PRIOR ART)
FIG. 1B depicts two such acousto-optic deflectors arranged conventionally in an orthogonal fashion to deflect an incident light beam to any one at a time of a plurality of target areas which form the rows and columns of a matrix array.

In FIG. 1B, vertical deflector 100 may be identical to the unit shown in FIG. 1A except that it is turned upside down. In addition, horizontal deflector 105 is identical to the deflector 100 but is orthogonally oriented with respect thereto. For illustrative purposes it is assumed that the unit 105 is capable, under the control of applied deflection signals, of deflecting an incident light beam to any one of, say, three target areas disposed along a horizontal straight line. These areas are assumed to fall within the entry or left-hand face of the vertical deflector 100. In turn, the unit 100 is adapted to deflect a beam directed at any specified one of these three areas to, for example, three target areas disposed along a vertical straight line. As a result, the cascaded deflectors 100 and 105 are effective to deflect an incident light beam to any selected one of nine target areas arranged in a matrix of rows and columns. In FIG. 1B these nine areas are represented by dots positioned in a so-called output plane 110.

The light beam directed at the deflectors 100 and 105 of FIG. 1B is provided by a source 115. Illustratively, this source comprises a laser whose output is a collimated light beam with a circular cross section, which is typical of a laser operating in the $TEM_{00}$ transverse mode. Other types of sources such as, for example, expanded or contracted or modulated laser beams, higher-order laser beams, collimated and/or filtered arc discharges or other light sources also may be employed to provide a light beam to be deflected by the depicted apparatus.

Figure 2:
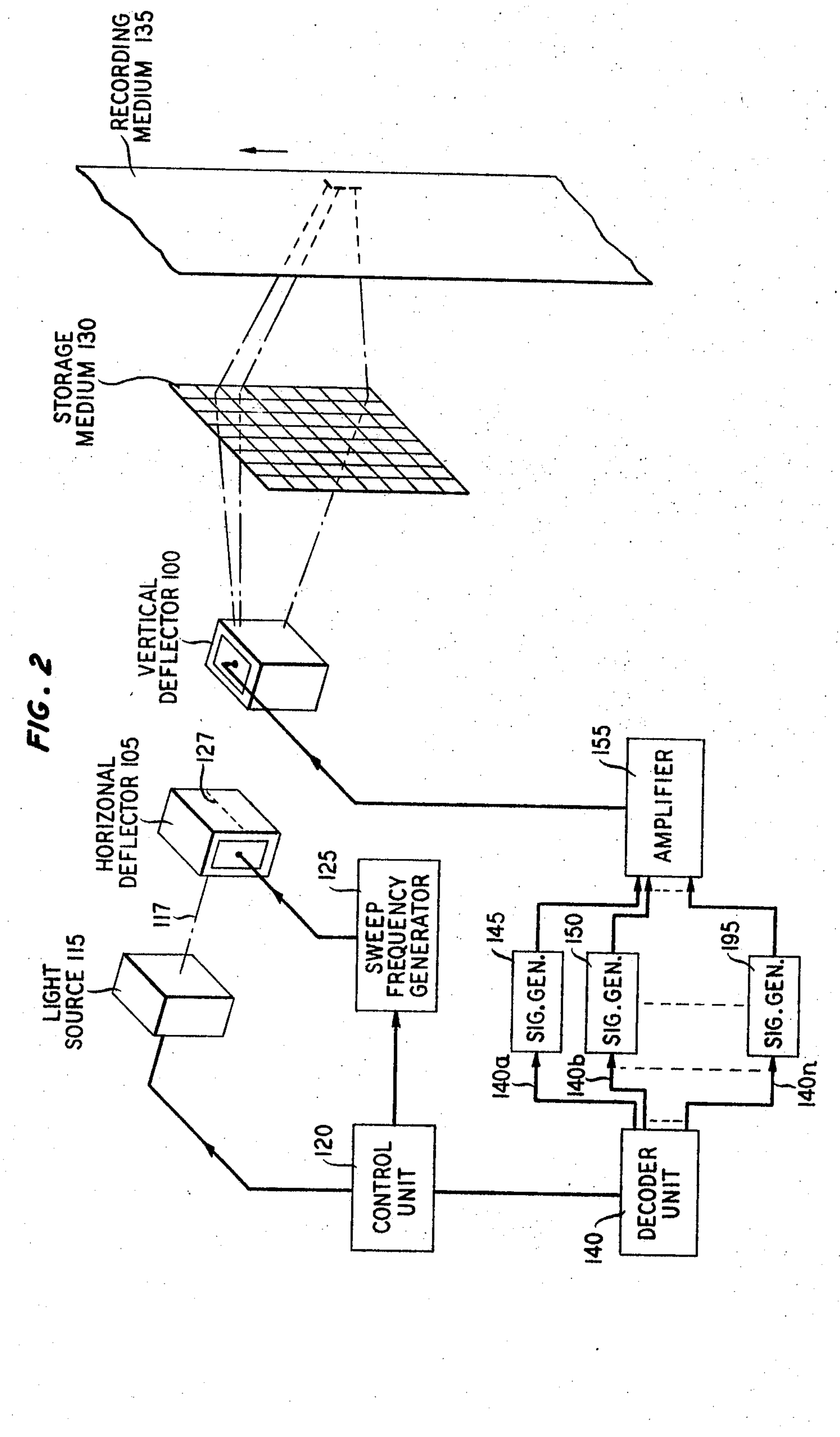
FIG. 2 shows a specific illustrative high-speed printing apparatus made in accordance with he principles of the present invention.

A specific illustrative high-speed printing apparatus made in accordance with the principles of the present invention is shown in FIG. 2. The light source 115 and the vertical and horizontal deflectors 100 and 105 respectively included in the FIG. 2 apparatus may, for example, comprise conventional units that are identical to the correspondingly-numbered elements depicted in FIG. 1B. For some applications of practical interest, however, it is advantageous to use a laser, for example a helium-neon one, operated in a conventional pulsed mode, as the source 115. For illustrative purposes such a source will be assumed herein. In the pulsed mode of operation the output of the source 115 comprises a sequence of narrow spaced-apart optical pulses each of which is propagated from the source 115 to the deflector 105 along a reference axis 117. The repetition rate, modulation and synchronization of such a sequence of pulses is determined in a straightforward way by applying electrical signals to the source 115 from a conventional control unit 120.

A sweep-frequency generator 125 shown in FIG. 2 is controlled by the unit 120 to apply horizontal deflection signals to the unit 105. Illustratively, the generator 125 is controlled to apply to the deflector 105 repetitive sequences of signals. Each of the signals in a sequence has a different preselected frequency. In particular, the different signals in each sequence are controlled to occur during the respective time slots in which optical pulses provided by the source 115 are propagated through the deflector 105. The frequencies of the signals applied to the deflector 105 are chosen to cause the optical pulses successively emanating from the right-hand face of the deflector 105 to exit therefrom in an ordered right-to-left fashion from spaced-apart areas that lie along a horizontal reference line 127. By way of example, it will be assumed herein that the deflector 105 is capable of successively directing light to one at a time of eight discrete areas disposed along the line 127.

As indicated above, the vertical deflector 100 shown in FIG. 2 may be identical in configuration to the vertical deflector of FIG. 1B. But, in accordance with the principles of the present invention, the vertical deflector 100 of FIG. 2 is driven in a unique manner which makes it possible for the printing system of FIG. 2 to operate in a new and advantageous way. More specifically, the deflector 100 is driven by a composite electrical waveform which results from the superposition of plural input signals each having a different discrete frequency. (The circuitry for providing such a composite signal will be described later below.) In response to such a waveform, the deflector 100 disperses an incident light beam to plural positions each respectively associated with a different one of the constituent signals in the composite waveform. Thus, for example, if three signals, each characterized by a different frequency, are simultaneously applied to the deflector 100 during the propagation therethrough of an optical pulse, portions of the pulse emanate from three different preassigned areas of the right-hand face of the deflector 100.

The plural beams simultaneously emanating from the vertical deflector 100 of FIG. 2 are respectively directed at plural spaced-apart areas of a storage medium 130. Advantageously, the medium 130 comprises a plate that has been selectively exposed to radiation and processed in a manner well known in the art to record permanently the interference patterns of coherent wave fronts. Such a plate is called a hologram. Hereinafter, the specific illustrative embodiment depicted in FIG. 2 will be assumed to include a hologram as the storage medium 130.

An advantage of using a hologram as the storage medium 130 is that alignment and registration problems in the depicted system are thereby minimized. The illumination of a selected holographic representation stored in the medium 130 results in the selected representation being projected and imaged onto an output plane without the necessity of using any intervening optical components. The advantageous attributes of ease of alignment and simplicity of construction are well known to workers in the holographic art.

In the particular storage medium 130 shown in FIG. 2, multiple individual holographic representations are stored in a spaced-apart fashion in ordered rows and columns. For the purpose only of assisting visualization of the storage format, the medium 130 is illustrated in FIG. 2 as being divided into an 8 ×8 array of square areas. An interference pattern is stored in each of the 64 areas.

In accordance with one aspect of the principles of the present invention, the number of holographic representations stored in each row of the medium 130 equals the number of character positions per line on a recording medium 135. Thus, in the apparatus depicted in FIG. 2, it is assumed that the medium 135 (which, for example, is made of any suitable light-sensitive material) is capable of recording eight distinct characters per line. Accordingly, the storage medium 130 includes eight holographic representations in each row. Moreover, the representations stored in the medium 130 are formatted such that the eight indications stored in a given row are identical to each other.

Furthermore, in accordance with the principles of this invention, each holographic indication stored in one of the elemental areas shown on the storage plate 130 is representative of only a constituent part of a complete character to be printed. The constituent parts are selected so that specified groups thereof when projected together will combine to form any desired character or symbol of a complete font set.

A great variety of font sets are known and used in the printing art. For any such set, a suitable group of basic-building-block parts can be easily formulated. For example, as indicated earlier above, seven differently-oriented bar segments are sufficient, when selectively combined, to form any one of the numerals 0 through 9.

In one simple illustrative case, each area of the medium 130 is designed to store a differently-positioned or oriented dot or bar segment. Simultaneous accessing of plural preselected such areas causes the respective parts stored therein to be projected and imaged simultaneously onto the recording medium 135 where reconstitution and printing of a desired character take place.

The aforementioned storage format embodied in the medium 130 makes it possible to project any selected character of a complete font set onto the recording medium 135 without the necessity for any horizontal translation of the medium 135. This capability is based on the fact that each column of representations stored in the medium 130 contains a complete set of constituent parts. In turn, each different column is disposed in registry with a different one of the plural character positions contained on a line of the recording medium 135. Thus, by directing plural light beams to preselected areas (row positions) of a particular column, the constituent parts of a character are thereby projected onto the medium 135 at the position which corresponds to the particular column.

Once a complete line of characters has been printed on the recording medium 135 in the manner described above, the medium 135 is translated by a predetermined amount in a vertical direction. Any suitable means may be utilized to accomplish such vertical movement. Printing of the next line then takes place, and so forth.

Conventional circuitry for generating a composite waveform to be applied to the vertical deflector 100 is shown in FIG. 2. The control unit 120, which may, for example, comprise a special-purpose hard-wired unit or a general-purpose computer suitably programmed to carry out a prescribed printing task, applies electrical signals to a decoder unit 140. These signals are uniquely representative of characters to be printed by the depicted apparatus. Thus, for example, assume that the control unit 120 applies a sequence of signals uniquely representative of the letter A to the decoder unit 140. The unit 140 responds thereto by converting the applied signals to energization of a specified number of the output lines 140*a*, 140*b* . . . 140*n* emanating therefrom. For the letter A, the unit 140 might, for example, activate each of the lines 140*a*, 140*b* and 140*n* whereby each of signal generators 145, 150 and 195 is triggered to be active. In turn, each of the signal generators is adapted when triggered to supply an electrical output signal having a different characteristic frequency. Hence, activation in parallel of the generators 145, 150 and 195 causes three signals, each having a different frequency, to be simultaneously applied to amplifier 155. In the amplifier 155, the outputs of the activated signal generators are combined by straightforward superposition to form a composite waveform which is then utilized to drive the vertical deflector 100.

As described above, the effect of such a composite waveform applied to the vertical deflector 100 is to cause the light beam output of the deflector 100 to simultaneously access three different spaced-apart areas of the storage medium 130. In accordance with the principles of this invention, each of these areas stores a constituent part of the character selected to be printed. Thus, for the letter A, the accessed areas store, for example, respective bar segments which when combined on the recording medium 135 cause the reconstituted letter A to be printed thereon.

In an apparatus made in accordance with the principles of the present invention, the respective intensities of the plural light beams emanating from the vertical deflector 100 can easily be controlled. This is done simply by selectively controlling the respective amplitudes of the component signals included in the waveform that is applied by the amplifier 155 to the deflector 100. The apparatus is thereby, for example, rendered capable of printing representations whose constituent parts can be selectively shaded to any brightness value between white and black. In this way a powerful graphics capability can be imparted to the apparatus shown in FIG. 2.

In addition, the capability of the FIG. 2 apparatus to vary the respective intensities of the light beams simultaneously applied to the recording medium 135 can be utilized to compensate for nonlinearities that may exist in the apparatus.

It is to be understood that the above-described arrangement is only illustrative of the application of the principles of the present invention. In accordance with these principles, numerous other arrangements may be devised by those skilled in the art without departing from the spirit and scope of the invention. For example, although particular emphasis herein has been directed to the use of a hologram as the storage medium 130, it is apparent that other implementations therefor are feasible. Thus, for instance, a conventional data or character mask (a plate having transparent and opaque regions) can be utilized instead of a hologram to store representations that are to be accessed and projected onto the recording medium 135. In such an alternative embodiment, however, suitable lenses must be interposed between the mask and the medium 135.

What is claimed is:

1. High-speed printing apparatus comprising
a storage medium,
a radiation-sensitive recording medium,
and means for dividing an incident radiant beam into plural beams and for directing said beams to preselected areas of said storage medium thereby to project onto a character position of said recording medium images of the plural representations stored in said preselected areas.

2. High-speed printing apparatus comprising
means for storing the constituent parts of a set of representations to be printed,
a source for providing a coherent beam of radiation,
means interposed between said source and said storing means for directing said beam simultaneously to the plural areas of said storing means that contain the constituent parts of a representation to be printed,
and means disposed in registry with said storing means for receiving therefrom images of the selected constituent parts and for providing a printed record of the representation formed by said plural parts.

3. In combination,
a radiation-sensitive recording medium,
means for directing a radiant beam at said recording medium,
means interposed between said directing means and said recording medium for deflecting said beam by acoustic Bragg diffraction,
and means interposed between said deflecting means and said recording medium for storing representations to be recorded on said medium and for projecting an image of a selected stored representation onto said medium in response to said beam being deflected to an area of said storing means that contains said selected representation,
wherein the improvement comprises means connected to said deflecting means for directing portions of said beam simultaneously to plural selected areas of said storing means.

4. A combination as in claim 3 wherein said directing means comprises a helium-neon laser operated in a pulsed mode for supplying spaced-apart optical pulses.

5. A combination as in claim 4 wherein said deflecting means comprises cascaded horizontal and vertical acousto-optic deflectors.

6. A combination as in claim 5 wherein said storing means comprises a hologram.

7. A combination as in claim 6 wherein the representations stored in said hologram are formatted in rows and columns and wherein the representations stored in a given row are identical to each other and constitute a constituent element of a complete font set.

8. A combination as in claim 7 wherein the means connected to said deflecting means comprises means connected to said vertical deflector for applying thereto a composite electrical waveform which results from the superposition of plural signals each having a different frequency and which waveform is in effect definitive of the various constituent elements of a character to be accessed and recorded.

* * * * *